(12) United States Patent
Ahn et al.

(10) Patent No.: US 11,487,698 B2
(45) Date of Patent: Nov. 1, 2022

(54) PARAMETER SERVER AND METHOD FOR SHARING DISTRIBUTED DEEP LEARNING PARAMETER USING THE SAME

(71) Applicant: ELECTRONICS AND TELECOMMUNICATIONS RESEARCH INSTITUTE, Daejeon (KR)

(72) Inventors: Shin-Young Ahn, Daejeon (KR); Eun-Ji Lim, Daejeon (KR); Yong-Seok Choi, Daejeon (KR); Young-Choon Woo, Daejeon (KR); Wan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/216,322

(22) Filed: Mar. 29, 2021

(65) Prior Publication Data
US 2021/0216495 A1    Jul. 15, 2021

Related U.S. Application Data

(63) Continuation of application No. 15/984,262, filed on May 18, 2018, now Pat. No. 10,990,561.

(30) Foreign Application Priority Data

Jun. 1, 2017    (KR) .................. 10-2017-0068445

(51) Int. Cl.
*G06F 15/173*    (2006.01)
*G06N 3/08*    (2006.01)
(Continued)

(52) U.S. Cl.
CPC .......... *G06F 15/17331* (2013.01); *G06F 9/50* (2013.01); *G06N 3/08* (2013.01); *H04L 67/10* (2013.01)

(58) Field of Classification Search
CPC ......... H04L 67/10; G06N 3/08; G06F 9/5016; G06F 9/5022; G06F 15/17331
See application file for complete search history.

(56) References Cited

U.S. PATENT DOCUMENTS 7,895,380 B2    2/2011    Pourbigharaz et al.
8,386,719 B2    2/2013    Lee et al.
(Continued)

FOREIGN PATENT DOCUMENTS

KR    10-1559089 B1    10/2015
KR    1020180051987 A    5/2018
KR    1020180125734 A    11/2018

OTHER PUBLICATIONS

Langer et al., "Distributed Training of Deep Learning Models: A Taxonomic Perspective", 2020, IEEE Transactions on Parallel and Distributed Systems, 2020, vol. 31, Issue: 12, pp. 2802-2818.*
(Continued)

*Primary Examiner* — Douglas B Blair

(57) ABSTRACT

Disclosed herein are a parameter server and a method for sharing distributed deep-learning parameters using the parameter server. The method for sharing distributed deep-learning parameters using the parameter server includes initializing a global weight parameter in response to an initialization request by a master process; performing an update by receiving a learned local gradient parameter from the worker process, which performs deep-learning training after updating a local weight parameter using the global weight parameter; accumulating the gradient parameters in response to a request by the master process; and performing an update by receiving the global weight parameter from the
(Continued)

master process that calculates the global weight parameter using the accumulated gradient parameters of the one or more worker processes.

6 Claims, 10 Drawing Sheets

(51) Int. Cl.
*H04L 67/10* (2022.01)
*G06F 9/50* (2006.01)

(56) References Cited

U.S. PATENT DOCUMENTS

| | | | |
|---|---|---|---|
| 8,768,870 B1 | 7/2014 | Corrado et al. | |
| 9,519,597 B2 | 12/2016 | Song et al. | |
| 10,402,469 B2* | 9/2019 | McMahan | G06F 17/17 |
| 10,585,726 B2 | 3/2020 | Lim et al. | |
| 10,810,492 B2* | 10/2020 | Xu | G06N 3/0454 |
| 10,942,864 B2* | 3/2021 | Kim | G06F 12/1072 |
| 2015/0324690 A1 | 11/2015 | Chilimbi et al. | |
| 2016/0103901 A1 | 4/2016 | Kadav et al. | |
| 2016/0232445 A1* | 8/2016 | Srinivasan | G06N 3/0472 |
| 2016/0307115 A1 | 10/2016 | Wu | |
| 2017/0098171 A1* | 4/2017 | Kumar | G06N 3/084 |
| 2018/0129939 A1 | 5/2018 | Yang | |
| 2018/0218257 A1* | 8/2018 | Xu | G06F 9/4806 |
| 2018/0300171 A1* | 10/2018 | Qiao | G06F 9/5088 |
| 2018/0307972 A1* | 10/2018 | Feng | G06F 12/1009 |
| 2018/0349788 A1* | 12/2018 | Sarkar | G06N 3/08 |
| 2019/0244135 A1* | 8/2019 | Melamed | G06N 20/00 |
| 2019/0324759 A1* | 10/2019 | Yang | G06N 3/084 |

OTHER PUBLICATIONS

Ben-Nun et al., "Demystifying Parallel and Distributed Deep Learning: An In-Depth Concurrency Analysis", Sep. 15, 2018, https://arxiv.org/abs/1802.09941.*

Ren Wu et al., "Deep Image: Scaling up Image Recognition", Baidu, Feb. 6, 2015, pp. 1-8.

* cited by examiner

PARAMETER SERVER AND METHOD FOR SHARING DISTRIBUTED DEEP LEARNING PARAMETER USING THE SAME

CROSS REFERENCE TO RELATED APPLICATION

This application is a continuation of U.S. patent application Ser. No. 15/984,262, filed May 18, 2018, and claims the benefit of Korean Patent Application No. 10-2017-0068445, filed Jun. 1, 2017, which is hereby incorporated by reference in its entirety into this application.

BACKGROUND OF THE INVENTION

1. Technical Field

The present invention relates generally to technology for sharing parameters for which training is performed in a distributed manner in a distributed deep-learning framework, and more particularly to technology for accelerating parameter sharing between distributed deep-learning processes by allowing the distributed deep-learning processes to access the physical memory of a parameter server in the form of shared memory.

2. Description of the Related Art

Deep learning is a class of machine learning based on an artificial neural network in which machines learn by mimicking human biological neurons. These days, deep-learning technology is contributing to the development of image and speech recognition and natural-language processing, thereby receiving a lot of attention. The current deep-learning model is being developed into a deep and wide model having more layers and more features in order to increase the recognition performance of applications.

However, it is difficult for only a single machine to process a large deep-learning model and a huge amount of learning data. Accordingly, in order to make use of large-scale distributed computing resources, a distributed deep-learning platform has been developed.

In the distributed deep-learning platform, distributed parallel processing can be performed in order to accelerate deep-learning training, in which case distributed parallel processing may include data parallelism and model parallelism. Data parallelism is a method in which an input data set for which training is to be performed is divided into parts and training is performed with respect to the respective parts by multiple computers. Model parallelism is a method in which different parts of a deep-learning model are assigned to multiple computers and training is performed.

When deep-learning training is performed through distributed parallel processing, parameters for which training is to be performed, such as weights, features, and the like, must be shared between all computers. As a method for sharing such parameters, there are a sharing method based on full mesh topology, in which computers each directly deliver parameters to all other computers, and a sharing method based on star topology, in which all distributed computers read and write parameters from and to a shared place. Most distributed platforms use the sharing method based on star topology. Accordingly, parameters are interchanged using centralized parameter-sharing storage (a parameter server).

In the parameter-sharing method, distributed computers must update parameters in a centralized manner. Therefore, the distributed computers that perform training are required to synchronize parameters at every period in which a weight should be updated, that is, after each iteration of training. When a synchronous update method is applied, computers that process deep learning in a distributed manner transmit parameters to a parameter server after each iteration of training, whereby the parameters trained in a distributed manner are collected in the parameter server.

When an asynchronous update method is applied, training proceeds in the state in which the parameter server does not synchronize early- or late-arriving parameters. The asynchronous method is advantageous in that training may be performed quickly without significantly sacrificing accuracy compared to the synchronous method. Most distributed frameworks provide either or all of the synchronous method and the asynchronous method.

In order to implement a parameter server in a distributed deep-learning platform, the process playing the role of a master allocates an area for storing a master parameter in the memory thereof. Here, the master parameter is updated using the parameters delivered in the form of communication messages sent from worker processes (or slave processes) that perform distributed training, and the updated master parameter is again distributed to the worker processes. Distributed platforms, such as Petuum, CNTK, and the like, may use distributed key-value storage, which is developed for the purpose of being used as a parameter server.

According to the conventional art, a parameter server and distributed computers exchange parameters by sending and receiving messages. However, when parameters are interchanged by sending and receiving messages, communication overhead and the amount of time that CPUs or GPUs wait may increase, which leads to a decrease in resource utilization.

Accordingly, it is necessary to develop a method for sharing parameters, which may significantly reduce communication overhead, caused due to additional memory copies, protocol processing, and the like, and improve communication performance by overcoming the limitations of the conventional method in which a large number of parameters are sent and received using a communication protocol. In connection with this, Korean Patent No. 10-1559089 discloses a technology related to "Communication protocol for sharing memory resources between components of a device."

SUMMARY OF THE INVENTION

An object of the present invention is to enable processes that perform distributed training to exchange a large number of parameters in a distributed deep-learning platform.

Another object of the present invention is to significantly reduce additional memory copies and communication overhead, which are caused when a parameter server and distributed computers exchange parameters through a communication method using message transmission.

A further object of the present invention is to improve communication performance, compared to the method in which the parameters are interchanged through a communication method using message transmission, and to maximize the utilization of computation resources, which are idle while parameters are being sent and received.

In order to accomplish the above objects, a method for sharing distributed deep-learning parameters performed by a parameter server according to the present invention includes creating and allocating shared memory in response to a request from one or more distributed deep-learning processes, which include at least one of a master process and worker processes; initializing a master weight parameter area in the shared memory; performing, by the distributed deep-learning processes, distributed deep-learning training using deep-learning parameters shared through the shared memory; and deallocating and deleting the shared memory that is no longer used after the distributed deep-learning training is finished.

Here, creating and allocating the shared memory may include receiving a request to create remote shared memory for parameters from the master process; creating the shared memory in response to the request to create remote shared memory for parameters; sending a shared memory creation key and access information corresponding to the created shared memory to the master process; receiving a request to set an event from the master process and setting an event of the shared memory; receiving a request to allocate shared memory from the worker process that received the shared memory creation key from the master process; and allocating the shared memory and sending information that is necessary in order to access the allocated shared memory to the worker process.

Here, deallocating and deleting the shared memory may include receiving a request to deallocate shared memory from the worker process and deallocating the shared memory; receiving a request to delete shared memory from the master process when the shared memory is deallocated; and deleting the shared memory in response to the request to delete shared memory.

Here, performing the distributed deep-learning training may be configured such that the distributed deep-learning processes share the updated deep-learning parameters in a synchronous or asynchronous manner using the shared memory.

Here, performing, by the distributed deep-learning processes, synchronous distributed deep-learning training using the deep-learning parameters shared using the shared memory may include updating worker local weight parameter areas of the distributed deep-learning processes using a value of a master weight parameter in the shared memory; accumulating gradient parameters by receiving learned worker local gradient parameters from the worker processes that perform the distributed deep-learning training in the synchronous manner; receiving the master weight parameter, calculated using the accumulated gradient parameters of the one or more worker processes, from the master process, and updating the master weight parameter area; and announcing an update of the master weight parameter area to at least one of the worker processes.

Here, accumulating the gradient parameters may include storing the worker local gradient parameters, learned by the worker processes that perform the distributed deep-learning training, in worker gradient parameter areas in the shared memory; receiving a request to accumulate the gradient parameters from the worker processes; accumulating the worker gradient parameter stored in the shared memory, which corresponds to the request, into a master gradient parameter; and announcing completion of accumulation to the master process.

Here, performing, by the distributed deep-learning processes, asynchronous distributed deep-learning training using the deep-learning parameters shared using the shared memory may include updating worker local weight parameter areas of the one or more worker processes using a value of a master weight parameter in the shared memory; updating, by the one or more worker processes that perform the distributed deep-learning training, a worker gradient parameter in the shared memory; updating the master weight parameter area in response to a request to update the master weight parameter, which is received from the one or more worker processes; and deallocating and deleting the shared memory that is no longer used after the distributed deep-learning training is finished.

Also, a parameter server according to an embodiment of the present invention includes a communication-processing unit for sending and receiving a message to and from at least one of a master process and worker processes and supporting read and write operations based on Remote Direct Memory Access (RDMA); a shared memory management unit for managing allocation and deallocation of shared memory; a parameter calculation unit for calculating distributed deep-learning parameters; and an event-handling unit for announcing occurrence of an event to at least one of the master process and the one or more worker processes, corresponding to the shared memory, when the event for the shared memory has occurred.

Here, the parameter calculation unit may perform vector/matrix operations for two shared memory areas.

Here, the parameter calculation unit may perform the at least one vector operation of an operation for multiplying a first vector by a first constant, an operation for adding a second vector to the first vector multiplied by the first constant, and an operation for adding the first vector multiplied by the first constant and the second vector multiplied by a second constant.

Here, the parameter calculation unit may calculate the distributed deep-learning parameters that include at least one of a weight parameter and a gradient parameter.

Here, the master process is allowed to access all areas of the shared memory allocated by the master process, and the worker process is allowed to access only a master parameter area and a worker parameter area for storing a result of deep-learning training performed by the corresponding worker process.

Here, the parameter calculation unit may accumulate the gradient parameter when the distributed deep-learning parameters are shared in a synchronous manner.

Here, the parameter calculation unit may update the master weight parameter area using the worker gradient parameter received from the worker process when the distributed deep-learning parameter is shared in an asynchronous manner.

Here, the shared memory management unit may create shared memory in response to a request to create remote shared memory for parameters, which is received from the master process, and may send a shared memory creation key of the shared memory and information for accessing the shared memory to the master process.

Here, the shared memory management unit may receive a request to allocate shared memory from the worker process, which received the shared memory creation key from the master process, allocate the shared memory in response to the request to allocate shared memory, and send information for accessing the allocated shared memory to the worker process.

Here, the shared memory management unit may deallocate the shared memory in response to a request to deallocate shared memory, which is received from the worker process, and may delete the shared memory in response to a request to delete shared memory, which is received from the master process.

Here, the master process and the worker process may share the distributed deep-learning parameter by directly reading or writing the distributed deep-learning parameter stored in the parameter server through a high-speed network that supports Remote Direct Memory Access (RDMA).

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
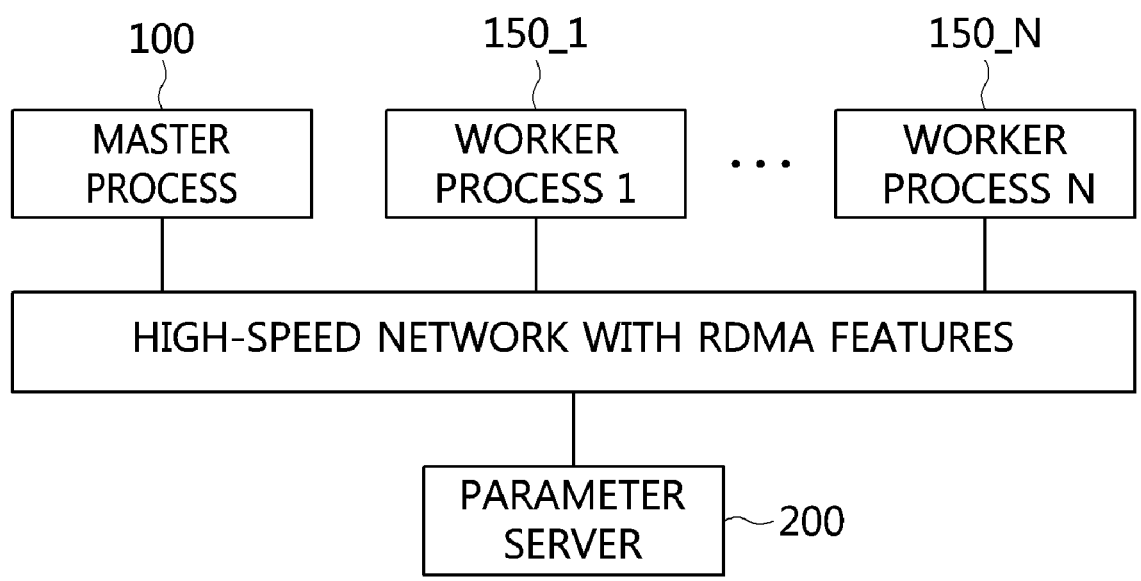
FIG. 1 is a view that schematically shows a distributed deep-learning framework environment in which a parameter server according to an embodiment of the present invention is applied.

Because the present invention may be variously changed, and may have various embodiments, specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that schematically shows a distributed deep-learning framework environment in which a parameter server according to an embodiment of the present invention is applied.

As illustrated in FIG. 1, distributed deep-learning processes, running on distributed computation nodes that perform deep-learning training, include a master process 100 and one or more worker processes 150. The master process 100, the worker processes 150, and a parameter server 200 are connected with each other via a high-speed network that supports Remote Direct Memory Access (RDMA).

The master process 100 creates remote shared memory in the parameter server 200 and performs overall control of the distributed deep-learning framework. The master process 100 delivers information about the remote shared memory to the worker processes 150, thereby enabling the worker processes 150 to access the same memory area in the parameter server 200. The worker processes 150 perform training and store the result of training.

The parameter server 200 provides shared memory for sharing distributed deep-learning parameters that include at least one of a weight parameter and a gradient parameter. Also, the parameter server 200 enables the distributed deep-learning processes 100 and 150 to perform distributed deep-learning training using the deep-learning parameters that are shared through the shared memory.

Hereinafter, the configuration and function of a parameter server according to an embodiment of the present invention will be described in detail with reference to FIG. 2.

Figure 2:
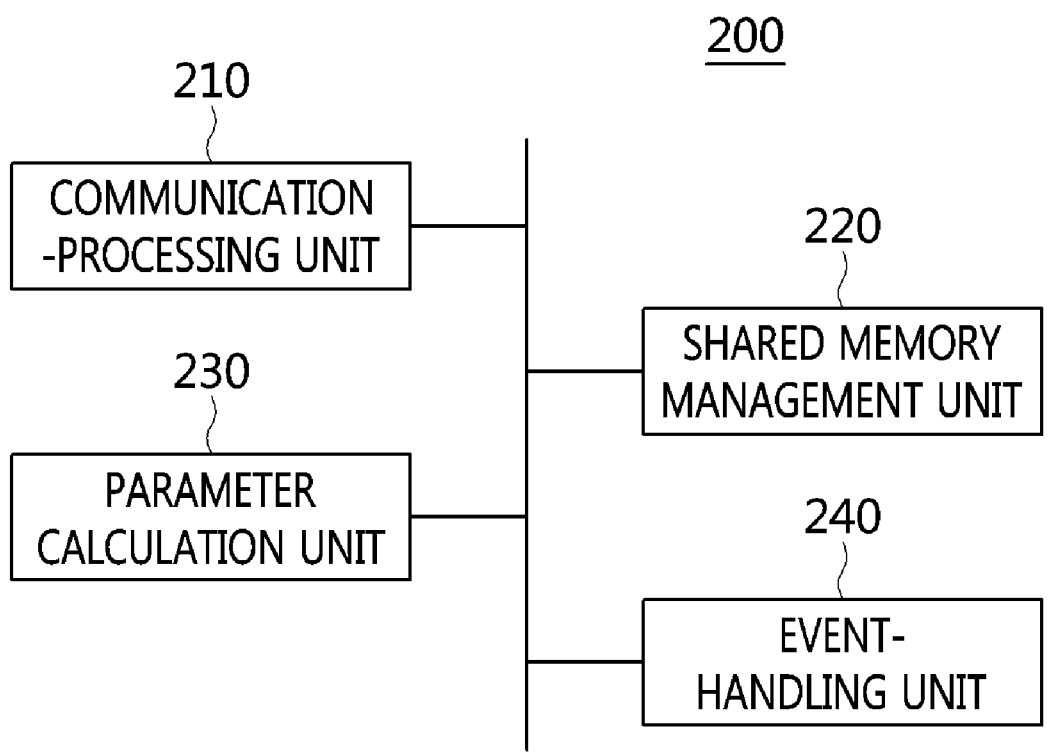
FIG. 2 is a block diagram that shows the configuration of a parameter server according to an embodiment of the present invention.

FIG. 2 is a block diagram that shows the configuration of a parameter server according to an embodiment of the present invention.

As illustrated in FIG. 2, a parameter server 200 includes a communication-processing unit 210, a shared memory management unit 220, a parameter calculation unit 230, and an event-handling unit 240.

The communication-processing unit 210 sends and receives messages to and from the distributed deep-learning training engine of at least one of a master process and one or more worker processes. The communication-processing unit 210 supports RDMA-based read and write operations performed by at least one of the master process and the worker processes.

The shared memory management unit 220 manages the creation, allocation, deletion, and deallocation of shared memory.

The shared memory management unit 220 may create shared memory in response to a request to create remote shared memory for parameters, which is received from the distributed master process or worker process, and may transmit the shared memory creation key of the shared memory and information for accessing the shared memory to the master process. Also, the shared memory management unit 220 receives a request to allocate shared memory from a worker process and allocates shared memory in response thereto. Then, the shared memory management unit 220 may send information for accessing the allocated shared memory to the worker process.

The shared memory management unit 220 may deallocate shared memory in response to a request by a worker process to deallocate shared memory, and may delete shared memory in response to a request by the master process to delete shared memory.

The parameter calculation unit 230 calculates distributed deep-learning parameters. Here, the distributed deep-learning parameters may include a weight parameter and a gradient parameter.

The parameter calculation unit 230 may perform vector/matrix operations for two shared memory areas, in which case the vector operation may be a 'scal' operation for multiplying a first vector 'X' by a first constant 'a', which is represented as 'X=aX', an 'axpy' operation for adding a second vector 'Y' to the first vector 'X' multiplied by the first constant 'a', which is represented as 'Y=aX+Y', an 'axpby' operation for adding the first vector 'X' multiplied by the first constant 'a' and the second vector 'Y' multiplied by a second constant 'b', which is represented as 'Y=aX+bY', or the like.

Also, when a distributed deep-learning parameter is shared in a synchronous manner, the parameter calculation unit 230 may accumulate gradient parameters, and may update a master weight parameter area by receiving the master weight parameter of the master process. When the distributed deep-learning parameter is shared in an asynchronous manner, the parameter calculation unit 230 may enable a worker process to update the local weight parameter area thereof using the value of the master weight parameter in the shared memory, and may update the master weight parameter area using a worker gradient parameter received from the worker process that performed distributed deep-learning.

When an event associated with shared memory has occurred, the event-handling unit 240 may announce the occurrence of the event to at least one of the master process and the worker process being allocated the shared memory. The event-handling unit 240 may send a notification message in order to announce the occurrence of an event related to a specific shared memory area to the distributed master process or worker process that shares the corresponding shared memory.

For example, when a specific shared memory area is updated or when a preset operation for the specific shared memory area is completed, the event-handling unit 240 may send the notification message to the selected distributed deep-learning training engine.

Hereinafter, the operation and function of a distributed deep-learning framework according to an embodiment of the present invention will be described in more detail with reference to FIGS. 3 to 5.

Figure 3:
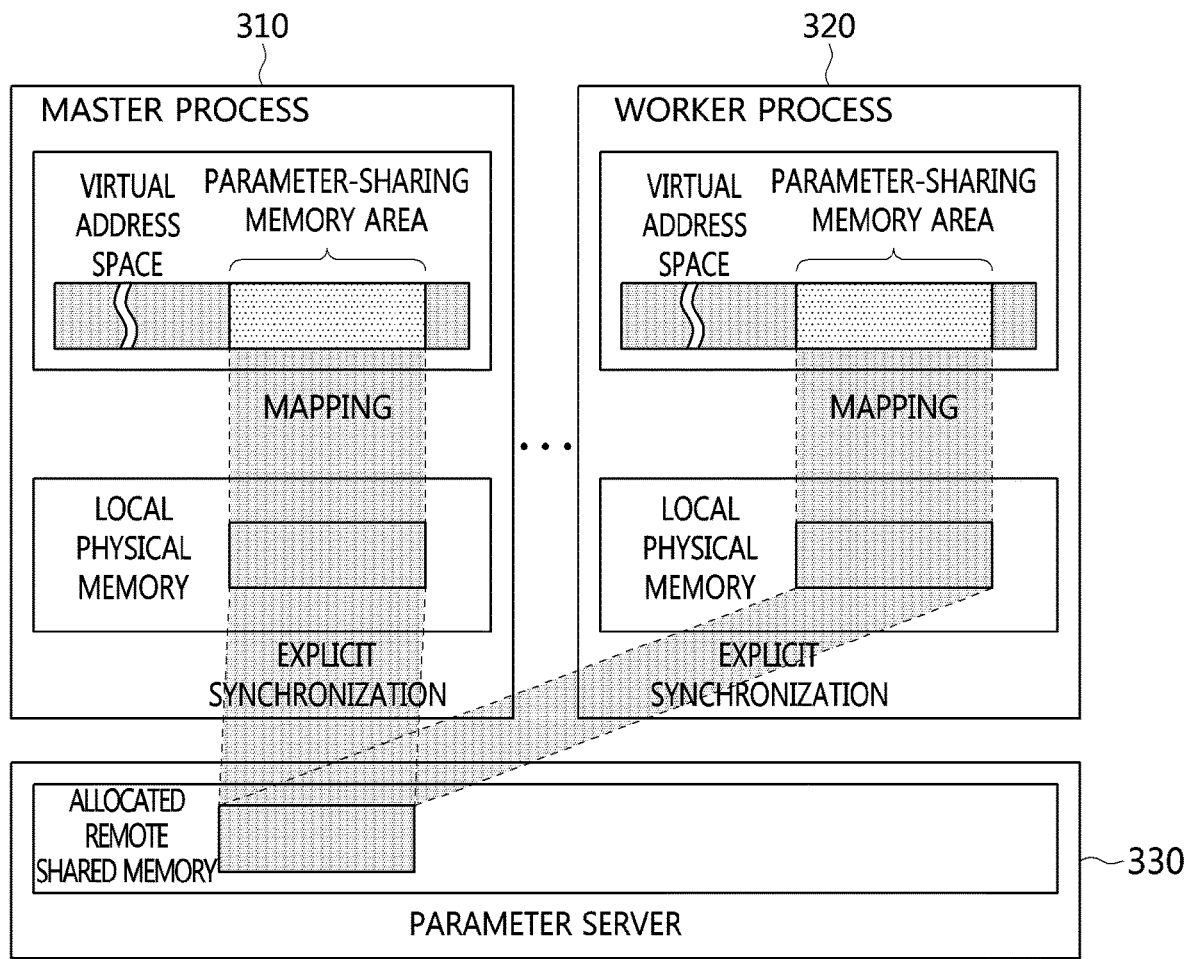
FIG. 3 is an exemplary view that shows a mechanism for mapping remote shared memory for sharing parameters to a virtual address space according to an embodiment of the present invention.

FIG. 3 is an exemplary view that shows a mechanism for mapping remote shared memory for sharing parameters to a virtual address space according to an embodiment of the present invention.

As shown in FIG. 3, a master process 310 and a worker process 320, each of which includes a distributed deep-learning training engine, create and allocate remote shared memory in a parameter server 330 in order to share parameters. Also, the master process 310 and the worker process 320 allocate local physical memory (host physical memory or the physical memory of an accelerator, such as a GUP or the like) therein, and map the local physical memory to a virtual address space.

Each of the master process 310 and the worker process 320 may be configured with a distributed deep-learning training engine and a parameter server access unit, and the distributed deep-learning training engine may perform training using a deep-learning model replica. Here, the role of the distributed deep-learning training engine may vary depending on whether the distributed deep-learning training engine is included in the master process 310 or the worker process 320.

The distributed deep-learning training engine of the master process 310 creates remote shared memory in the parameter server 330 and delivers information about the remote shared memory to the distributed deep-learning training engines of one or more worker processes 320, thereby enabling the worker processes 320 to access the same memory area in the parameter server 330. Here, the information about the remote shared memory may include a shared memory creation key, the size of the shared memory, and the like.

The distributed deep-learning training engine of the master process 310 or the worker process 320 may use the parameter server 330 running on a remote computation node through the parameter server access unit. Here, when the parameter server 330 allocates remote shared memory, the parameter server access unit is allocated local physical memory having the same size as the remote shared memory and maps the local physical memory to the virtual address space of the distributed deep-learning training engine.

The distributed deep-learning training engine of the master process 310 or the worker process 320 stores trained parameters in the local physical memory thereof. When a synchronization (write) request is explicitly made through an API provided by the parameter server access unit, the calculated parameter data in the local physical memory are copied to the remote shared memory of the parameter server 330. Also, the master process 310 or the worker process 320 may make a synchronization (read) request for reading the updated parameter from the remote shared memory.

For the convenience of description, the memory provided by the parameter server 330 is referred to as 'remote shared memory'. Here, although the memory is accessed using a shared memory access method, automatic synchronization of processes to which the shared memory is allocated is not provided, and the remote shared memory may be used as a kind of communication buffer.

Figure 4:
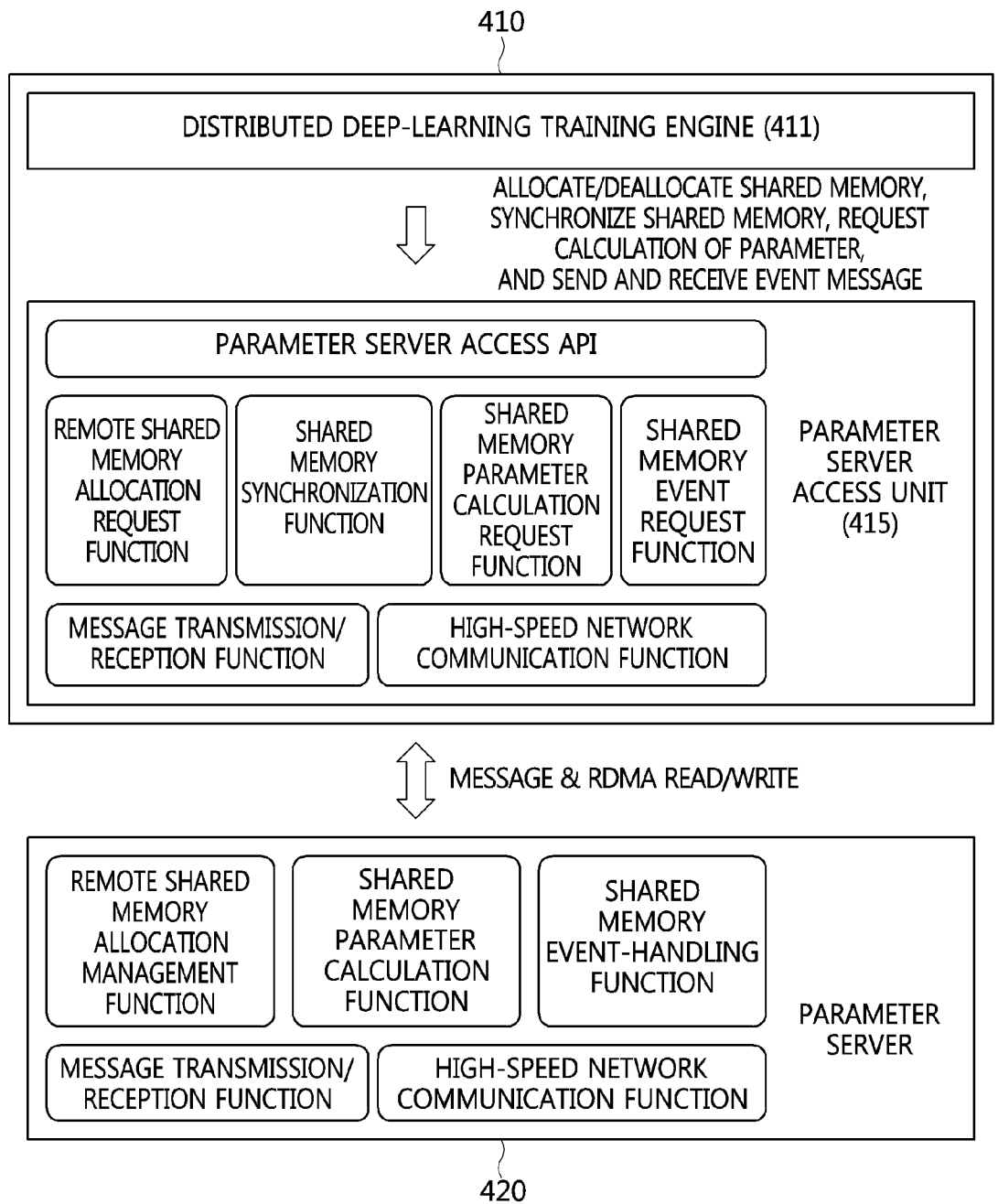
FIG. 4 is a block diagram for explaining the function of a distributed deep-learning framework according to an embodiment of the present invention.

FIG. 4 is a block diagram for explaining the function of a distributed deep-learning framework according to an embodiment of the present invention.

As illustrated in FIG. 4, the distributed deep-learning framework includes a distributed process 410 and a parameter server 420. The distributed process 410 may include a distributed deep-learning training engine 411 and a parameter server access unit 415.

From the aspect of the distributed deep-learning training engine 411, the parameter server access unit 415 may be provided in the form of a library by being linked to the distributed process (computation node) 410 along with the distributed deep-learning training engine 411, and all of the functions of the parameter server access unit 415 may be implemented in the form of a user-level library. Alternatively, only the parameter server access API may be implemented in the form of a library, and the other functions may be implemented in the form of a device driver.

The distributed deep-learning training engine 411 is run on the distributed process 410. The distributed deep-learning training engine 411 may share parameters with the distributed deep-learning training engine 411 of another distributed process using a parameter server access API provided by the parameter server access unit 415.

The parameter server 420 is run on a separate process. The parameter server 420 may send and receive messages to and from the parameter server access unit 415 of the distributed process 410 via a high-speed network channel, such as InfiniBand or the like, and may read from and write to remote shared memory base on Remote Direct Memory Access (RDMA).

The distributed deep-learning training engine 411 of the distributed process 410 may request allocation or deallocation of shared memory, explicit shared memory synchronization (read/write), and parameter calculation using a parameter server access API of the parameter server access unit 415.

The parameter server access unit 415 may include parameter server access APIs, a remote shared memory allocation request module, a shared memory synchronization module, a shared memory parameter calculation request module, a shared memory event request module, a message transmission/reception module and a high-speed network communication module.

When it receives a request from the distributed deep-learning training engine 411 through the parameter server access API, the parameter server access unit 415 may process the request using the corresponding component module.

For example, when it receives a request to allocate or deallocate shared memory, the parameter server access unit 415 may process the request using the remote shared memory allocation request module. When it receives a request to synchronize shared memory, the parameter server access unit 415 may instruct the shared memory synchronization module to read from or write to the remote memory.

When it receives a request to calculate parameters, the parameter server access unit 415 may instruct the shared memory parameter calculation request module to request the parameter server 420 to perform an operation on specific shared memory areas. When it receives a request to send or receive an event message, the parameter server access unit 415 may request the parameter server to send an event message through the shared memory event request module.

The parameter server 420 may process a request made by the parameter server access unit 415 of the distributed process 410, and may include a remote shared memory allocation management module, a shared memory parameter calculation module, a shared memory event-handling module, a message transmission/reception module, and a network communication module.

The remote shared memory allocation management module processes a request to create, delete, allocate, or deallocate shared memory, and the shared memory parameter calculation module may perform vector and matrix operations for two shared memory areas. The shared memory event-handling module may send a message for announcing an event for a specific shared memory area to the distributed deep-learning training engine 411 of the distributed process 410 that creates the corresponding shared memory area or is allocated the corresponding shared memory area.

For the convenience of description, a single distributed process 410 has been illustrated, but the distributed deep-learning framework may include one or more distributed processes 410, and the distributed processes 410 may be classified into a master process and a worker process depending on the function of the distributed deep-learning training engine 411 included therein.

Figure 5:
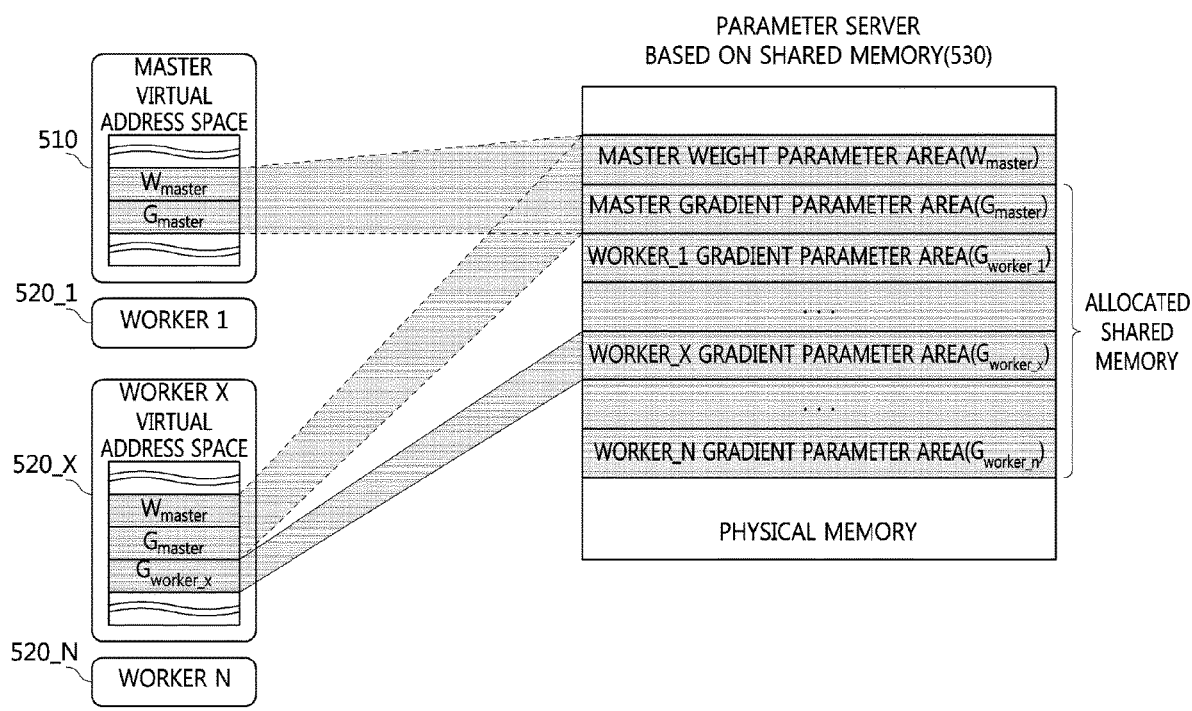
FIG. 5 is an exemplary view that shows an example of the allocation of remote shared memory to each process according to an embodiment of the present invention.

FIG. 5 is an exemplary view that shows an example of the allocation of remote shared memory to each process according to an embodiment of the present invention.

As shown in FIG. 5, a master process 510 functions to create remote shared memory for a master parameter. Because it creates remote shared memory in a parameter server 530, the master process 510 may access all of the remote shared memory areas created by itself, and may enable worker processes 520 to access the master area by sending shared memory creation information thereto.

Meanwhile, each of the worker processes 520 may create a worker gradient parameter area for storing the result of training performed by itself, and may access the worker gradient parameter area created by itself. That is, the worker process 520 is not allowed to access the memory area of another worker process, but is allowed to access the master parameter area and a worker parameter area for storing the result of training performed by the corresponding worker process 520. For example, the X-th worker process 520_X may access the master parameter area and the X-th worker parameter area.

For the convenience of description, each of the worker processes 520 has been illustrated as being allocated the shared memory of a single worker parameter area. However, because parameters are actually present in each deep-learning layer, each of the worker processes 520 may access a single master parameter and worker parameter in each deep-learning layer, and the master parameter area and worker parameter areas shown in FIG. 5 may represent multiple shared memory sets.

Hereinafter, a method for sharing distributed deep-learning parameters according to an embodiment of the present invention will be described in detail with reference to FIGS. 6 to 10.

Figure 6:
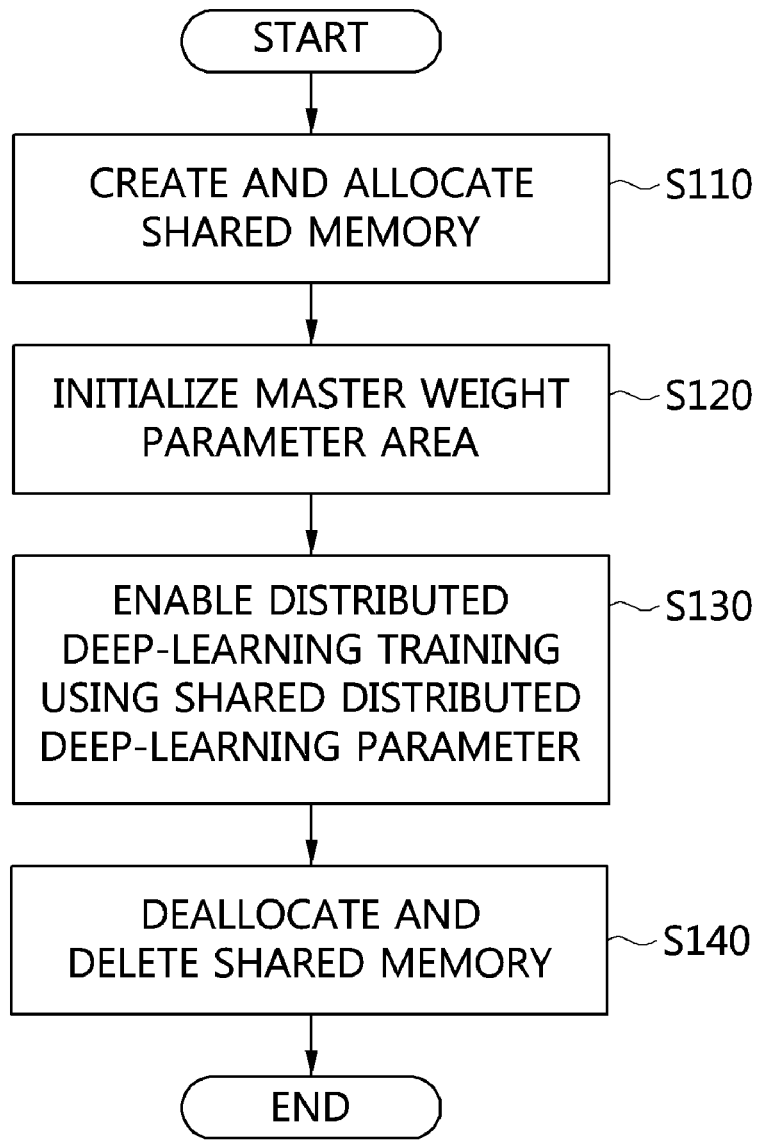
FIG. 6 is a flowchart that shows a method for sharing distributed deep-learning parameters according to an embodiment of the present invention.

FIG. 6 is a flowchart that shows a method for sharing distributed deep-learning parameters according to an embodiment of the present invention.

First, the parameter server 200 creates and allocates shared memory at step S110 in response to a request from a distributed deep-learning process.

The parameter server 200 may create shared memory in response to a request from a master process to create remote shared memory for parameters, and may allocate the shared memory in response to a request from a worker process to allocate shared memory. The process of creating and allocating shared memory will be described in detail later with reference to FIG. 7.

Then, the parameter server 200 initializes a master weight parameter area in the shared memory at step S120 and enables the distributed deep-learning processes to perform distributed deep-learning training using deep-learning parameters shared through the shared memory at step S130.

Here, the parameter server 200 shares the distributed deep-learning parameters in a synchronous or asynchronous manner, thereby enabling the distributed deep-learning processes to perform distributed deep-learning training. The process in which the parameter server 200 shares the distributed deep-learning parameters in a synchronous manner will be described in detail later with reference to FIG. 9. The process in which the parameter server 200 shares the distributed deep-learning parameters in an asynchronous manner will be described in detail later with reference to FIG. 10.

When the distributed deep-learning training is finished, the parameter server 200 deallocates and deletes the shared memory that is no longer being used at step S140.

The parameter server 200 deallocates the shared memory in response to a request from the worker process to deallocate shared memory, and deletes the shared memory upon receiving a request from the master process to delete shared memory. The process of deallocating and deleting the shared memory will be described in detail later with reference to FIG. 8.

Figure 7:
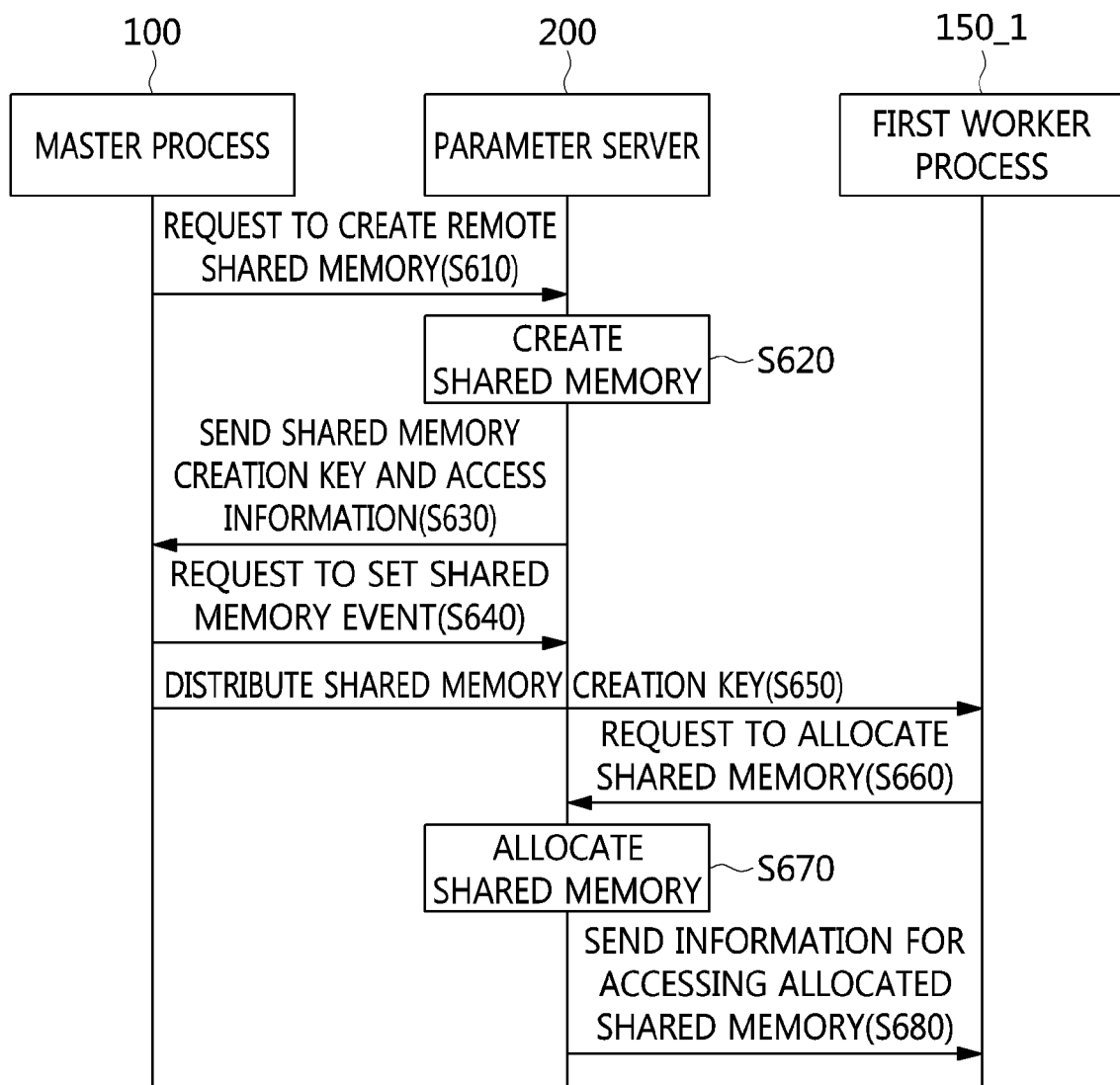
FIG. 7 is a flowchart that shows the process of creating and allocating remote shared memory according to an embodiment of the present invention.

FIG. 7 is a flowchart that shows the process of creating and allocating remote shared memory according to an embodiment of the present invention.

First, the master process 100 sends a request to create remote shared memory to the parameter server 200 at step S610.

The parameter server 200 creates shared memory at step S620 in response to the received request to create remote shared memory, and sends a shared memory creation key and access information to the master process 100 at step S630.

Here, the parameter server 200 may send the address of the shared memory, a remote memory access key, and the like, which are information that is necessary in order to access the created shared memory, to the master process 100, along with the shared memory creation key.

Subsequently, the master process 100 sends a request to set a shared memory event to the parameter server 200 at step S640.

The master process 100 may send a request to set a shared memory event, such as an update notification event, an accumulation completion event, and the like, to the parameter server 200. Here, the update notification event is an event for announcing an update to all of the worker processes 150 sharing certain shared memory when the master process 100 updates the corresponding shared memory.

The accumulation completion event is an event for sending a message for notifying the master process 100 of the completion of accumulation when the worker processes 150 finish accumulation in certain shared memory.

Also, the master process 100 distributes the shared memory creation key to one or more worker processes 150 at step S650.

For the convenience of description, an example in which the master process 100 distributes the shared memory creation key to a single worker process 150_1 has been illustrated in FIG. 7, but without limitation thereto, the master process 100 may distribute the shared memory creation key to multiple worker processes 150 included in the distributed deep-learning framework. Here, the master process 100 may distribute the shared memory creation key using a separate communication channel between the master process 100 and the worker process 150.

The first worker process 150_1, which received the shared memory creation key, sends a request to allocate shared memory to the parameter server 200 at step S660, and the parameter server 200 allocates shared memory at step S670.

The worker process 150, which received the shared memory creation key, may request the parameter server 200 to allocate shared memory using the shared memory creation key. Also, the parameter server 200 may allocate the created shared memory using the shared memory creation key.

Also, the parameter server 200 sends information for accessing the allocated shared memory to the first worker process 150_1 at step S680.

The parameter server 200 sends shared memory access information, such as the address of the shared memory, a remote memory access key, and the like, which are necessary in order to access the shared memory, to the worker process 150. The worker process 150, which received the shared memory access information, may perform a read or write operation based on RDMA at the address of the shared memory allocated thereto using the shared memory access information.

Also, when all of the worker processes 150 included in the distributed deep-learning framework receive the shared memory access information by performing step S680, the master process 100 may perform deep-learning training.

In addition to the example of allocation of shared memory shown in FIG. 7, the worker process 150 may autonomously allocate shared memory and share the same with other worker processes. When the allocation of memory shared between the deep-learning training engines included in the master process 100 and the worker processes 150 is completed, the deep-learning training engines may start training. During deep-learning training, deep-learning parameters may be shared between the master process 100 and the worker processes 150 using various methods.

Figure 8:
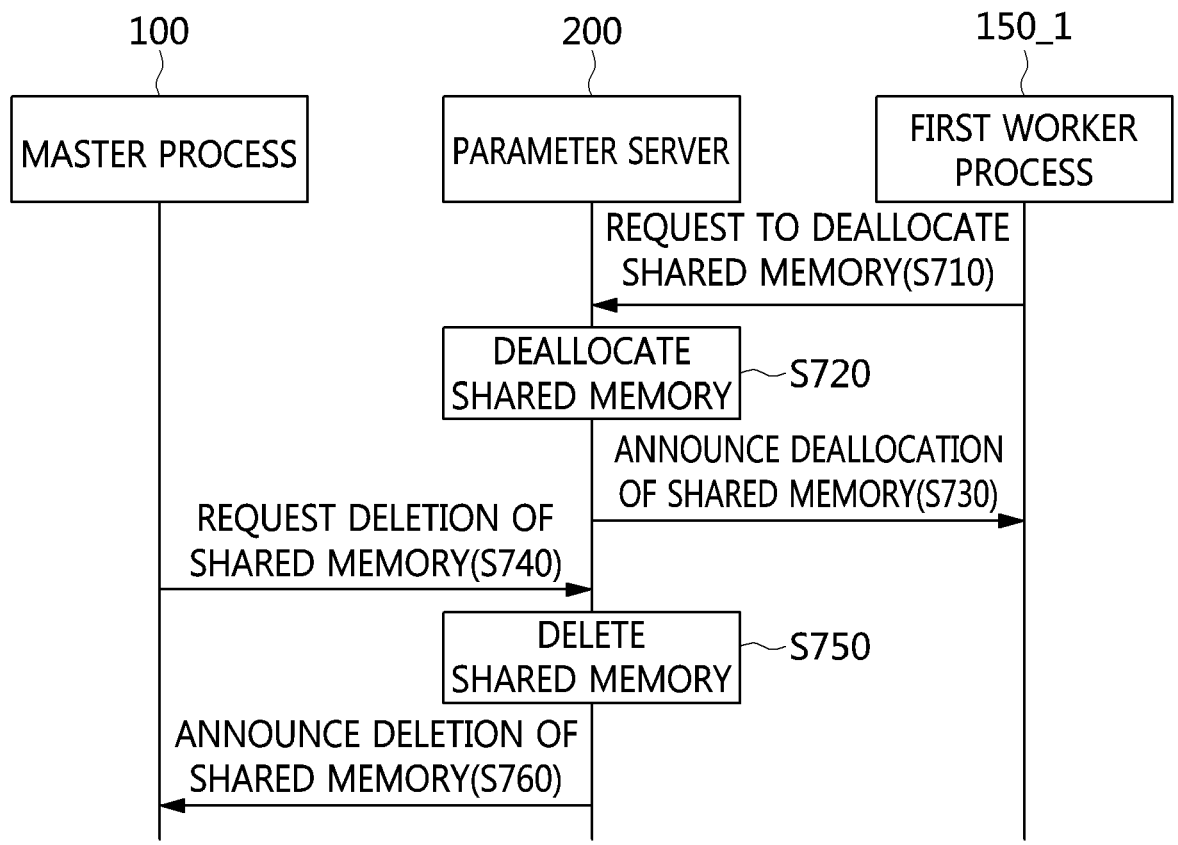
FIG. 8 is a flowchart that shows the process of deallocating and deleting remote shared memory according to an embodiment of the present invention.

FIG. 8 is a flowchart that shows the process of deallocating and deleting remote shared memory according to an embodiment of the present invention.

The first worker process 150_1 sends a request to deallocate shared memory to the parameter server 200 at step S710.

When deep-learning training is completed, each of the worker processes 150 may request the parameter server 200 to deallocate the remote shared memory allocated thereto.

The parameter server 200, which received the request to deallocate shared memory, deallocates the shared memory at step S720, and notifies the first worker process 150_1 of deallocation of the shared memory at step S730.

Here, the deallocation of shared memory may indicate that the parameter server 200 deletes information about sharing of the shared memory.

Also, the master process 100 sends a request to delete remote shared memory to the parameter server 200 at step S740, and the parameter server 200, which received the request to delete remote shared memory, deletes the shared memory at step S750 and notifies the master process 100 of completion of deletion of the shared memory at step S760.

Hereinafter, a method for sharing parameters in a synchronous or asynchronous manner in a distributed deep-learning framework environment according to an embodiment of the present invention will be described in detail with reference to FIG. 9 and FIG. 10.

After remote shared memory is created and allocated in the parameter server 200, the parameter server 200 may enable the distributed deep-learning processes 100 and 150 to perform distributed deep-learning training by sharing deep-learning parameters using the shared memory. That is, the master process 100 and one or more worker processes 150 share deep-learning parameters based on the parameter server 200, thereby repeatedly performing deep-learning training.

Here, the parameters created in the parameter server 200 may be classified into a master weight parameter $W_{master}$, a master gradient parameter $G_{master}$, and a worker_x gradient parameter $G_{worker\_x}$.

Figure 9:
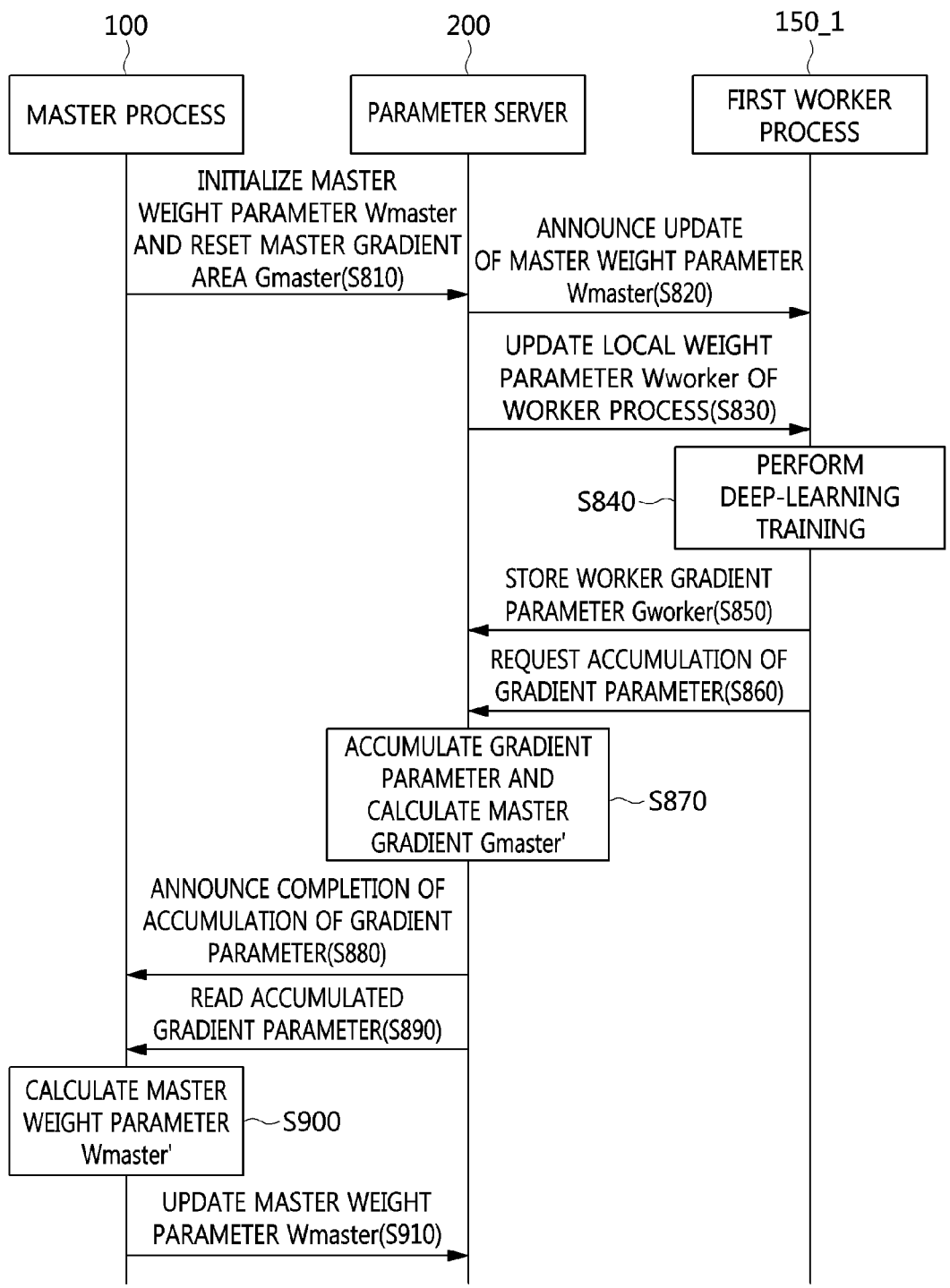
FIG. 9 is a flowchart for explaining a synchronous parameter-sharing method according to an embodiment of the present invention.
Figure 10:
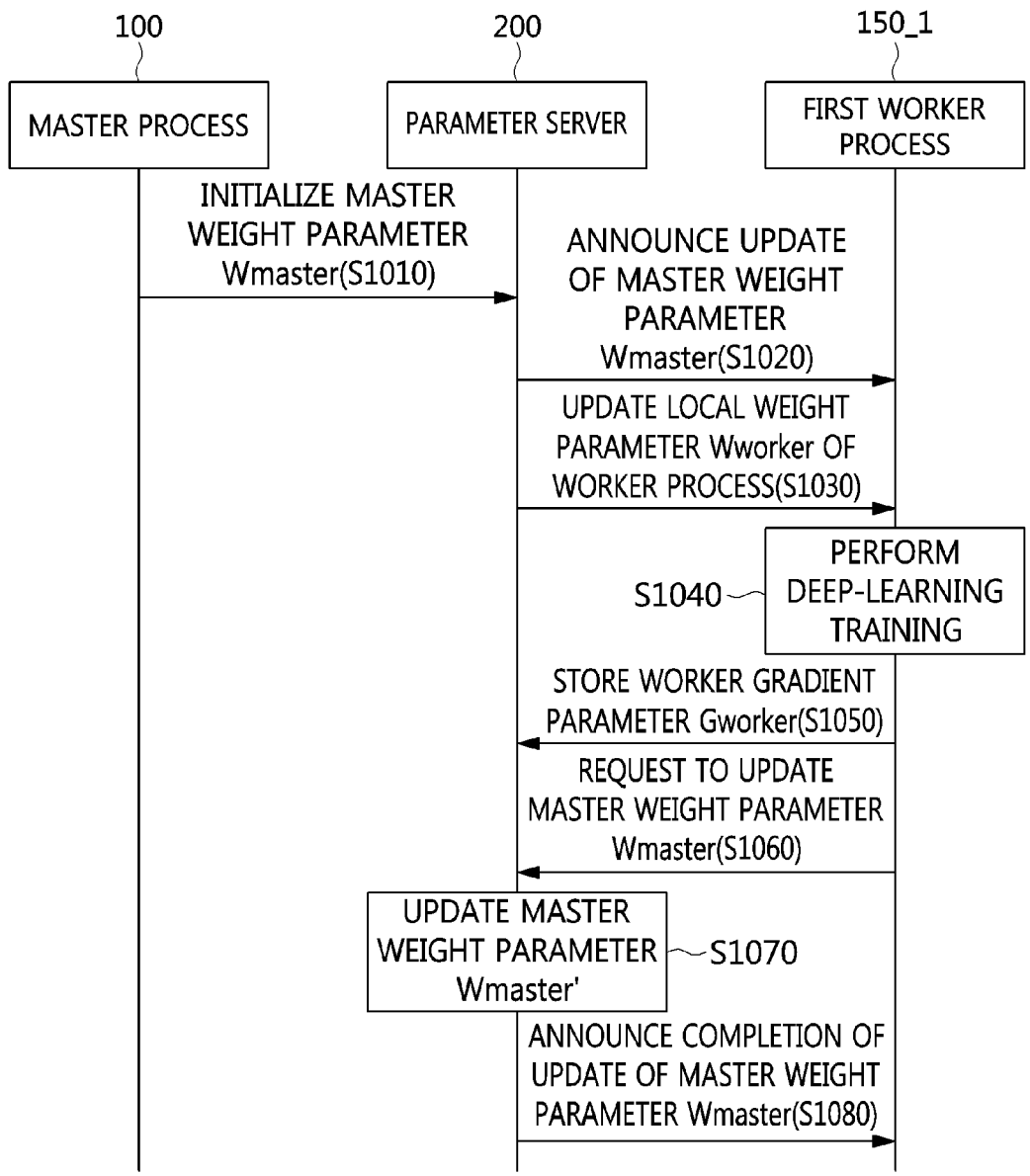
FIG. 10 is a flowchart for explaining an asynchronous parameter-sharing method according to an embodiment of the present invention.

During the deep-learning training process, distributed deep-learning parameters may be shared in a synchronous or asynchronous manner through the process illustrated in FIG. 9 or FIG. 10. Here, the process of sharing distributed deep-learning parameters, shown in FIG. 9 and FIG. 10, may be performed in different orders depending on the deep-learning algorithm.

Also, the process of sharing parameters, illustrated in FIG. 9 or FIG. 10, may be performed after the process of creating and allocating shared memory, illustrated in FIG. 7, is performed. The process of deallocating and deleting shared memory, illustrated in FIG. 8, may be performed after the process illustrated in FIG. 9 or FIG. 10 is performed.

FIG. 9 is a flowchart for explaining a synchronous parameter-sharing method according to an embodiment of the present invention.

First, the master process 100 initializes the master weight parameter area for storing the master weight parameter $W_{master}$ and the master gradient parameter area for storing the master gradient parameter $G_{master}$ in the parameter server 200 at step S810.

The master process 100 writes the value of a weight parameter, which is initialized in the local memory thereof, to the master weight parameter area, thereby initializing the master weight parameter area for storing the master weight parameter $W_{master}$. Also, the master process 100 may reset the master gradient parameter area for storing the master gradient parameter $G_{master}$ by setting all values to '0'.

Then, the parameter server 200 notifies the first worker process 150_1 of the update of the master weight parameter $W_{master}$ at step S820.

The parameter server 200 may notify one or more worker processes 150, which share the master weight parameter area, of the update of the master weight parameter $W_{master}$.

The first worker process 150_1 reads the master weight parameter $W_{master}$ and updates the local weight parameter thereof at step S830, and performs deep-learning training at step S840.

The first worker process 150_1 may update the local weight parameter area thereof using the value of the master weight parameter in the shared memory. That is, each of the worker processes 150 reads data from the master weight parameter area in the parameter server 200 through RDMA read and copies the same to the local weight parameter area for storing the local weight parameter $W_{worker}$ thereof ($W_{worker}=W_{master}$). Here, X denotes the serial number of a worker process, and the first worker process 150_1 may update a local weight parameter $W_{worker1}$.

At step S840, each of the worker processes 150 performs deep-learning training through a preset number of iterations of training. Here, the worker processes 150 may calculate only the gradient parameter $G_{worker}$ without updating the weight parameter.

Also, the first worker process 150_1 stores the local gradient parameter thereof in the parameter server 200 at step S850.

The worker processes 150, which performed deep-learning training, write the learned local gradient parameter $G_{worker}$ thereof to the worker gradient parameter areas in the shared memory through RDMA write. That is, the first worker process 150_1 may write the first worker local gradient parameter $G_{worker1}$ to the first worker parameter area in the parameter server 200 through RDMA write.

Then, the first worker process 150_1 requests the parameter server 200 to accumulate the gradient parameter at step S860. The parameter server 200 accumulates the gradient parameters stored in the requested gradient parameter areas at step S870.

The first worker process 150_1 requests the parameter server 200 to accumulate the first worker local gradient parameter $G_{worker1}$, which is stored in the first worker parameter area in the shared memory, into the master gradient parameter $G_{master}$. In response to the request, the parameter server 200 may perform the operation $G_{master}'=G_{master}+G_{worker}$ so as to accumulate parameters stored in the requested gradient parameter areas.

When the gradient parameters of all of the worker processes 150 are accumulated, the parameter server 200 notifies the master process 100 of the completion of the calculation of the master gradient parameter $G_{master}$ at step S880.

The master process 100 waits until the gradient parameters of all of the worker processes 150 included in the distributed deep-learning framework have been accumulated, and then reads the master gradient parameter $G_{master}$ from the master gradient parameter area in the parameter server 200 at step S890.

Here, the master process 100 may read the master gradient parameter $G_{master}$, into which the gradient parameters of all of the worker processes 150 have been accumulated, from the master gradient parameter area through RDMA read.

Then, the master process 100 calculates the master weight parameter $W_{master}'$ at step S900, and writes the master weight parameter $W_{master}'$ to the parameter server 200 at step S910.

The master process 100 may calculate the master weight parameter $W_{master}'$ using the average of the accumulated gradient parameter $G_{master}$, which is read at step S890. Also, the master process 100 may store the newly updated master weight parameter $W_{master}'$ in the master weight parameter area in the parameter server 200.

The master process 100 and the worker processes 150 may repeatedly perform steps S820 to S910 as many times as the preset training number.

FIG. 10 is a flowchart for explaining an asynchronous parameter-sharing method according to an embodiment of the present invention.

First, the master process 100 initializes the master weight parameter area for storing the master weight parameter $W_{master}$ in the parameter server 200 at step S1010. Then, the parameter server 200 notifies the first worker process 150_1 of the update of the master weight parameter $W_{master}$ at step S1020.

For the convenience of description, the parameter server 200 has been described as notifying the first worker process 150_1 of the update of the master weight parameter, but without limitation thereto, the parameter server 200 may notify one or more worker processes 150 included in the distributed deep-learning framework of the update of the master weight parameter $W_{master}$.

Next, the first worker process 150_1 reads the master weight parameter $W_{master}$ from the shared memory, updates a local weight parameter area for storing the local weight parameter $W_{worker}$ at step S1030, and performs deep-learning training at step S1040.

The first worker process 150_1 may read the master weight parameter $W_{master}$ through RDMA read, and may update the local weight parameter $W_{worker}$ thereof by copying the master weight parameter $W_{master}$ to the local weight parameter ($W_{worker}=W_{master}$). Then, the first worker process 150_1 may calculate the local gradient parameter $G_{worker}$ through a preset number of iterations of deep-learning training.

The first worker process 150_1, which performed deep-learning training, stores the newly learned gradient parameter $G_{worker}$ in the shared memory by writing the same thereto through RDMA write at step S1050. Then, the first worker process 150_1 requests the parameter server 200 to update the master weight parameter $W_{master}$ at step S1060.

The parameter server 200 updates the master weight parameter W$_{master}$ at step S1070 and notifies the first worker process 150_1, which requested the update, of the completion of the update at step S1080.

Here, the parameter server 200 may sequentially process the requests to update the master weight parameter, which are received from the multiple worker processes, rather than simultaneously processing the requests.

The parameter server 200 may announce the completion of the update of the master weight parameter area to one or more worker processes 150. Here, if deep-learning training has not been completed, the processes of steps S1030 to S1080 may be repeatedly performed.

Although not illustrated in FIG. 9 and FIG. 10, before deep-learning training finishes, the process of storing the master weight parameter may be performed.

According to the present invention, processes that perform distributed training may exchange a large number of parameters in a distributed deep-learning platform.

Also, according to the present invention, additional memory copies and communication overhead, which are caused when a parameter server and distributed computers exchange parameters through a communication method using message transmission, may be significantly reduced.

Also, according to the present invention, communication performance may be improved, compared to the method in which parameters are interchanged through a communication method using message transmission, and the utilization of computation resources, which are idle while parameters are being sent and received, may be maximized.

As described above, the parameter server and the method for sharing distributed deep-learning parameters using the parameter server according to the present invention are not limitedly applied to the configurations and operations of the above-described embodiments, but all or some of the embodiments may be selectively combined and configured, so that the embodiments may be modified in various ways.

What is claimed is:

1. A method for sharing distributed deep-learning parameters, performed by a parameter server, comprising:
    creating and allocating shared memory in response to a first request from a plurality of distributed deep-learning processes, which include a master process and one or more worker processes;
    initializing a master weight parameter area in the shared memory;
    enabling the plurality of distributed deep-learning processes to perform distributed deep-learning training using deep-learning parameters shared through the shared memory; and
    deallocating and deleting the shared memory that is no longer used after the distributed deep-learning training is finished,
    wherein deallocating and deleting the shared memory comprises:
    receiving a second request to deallocate the shared memory from the one or more worker processes;
    deallocating the shared memory in response to the second request;
    receiving a third request to delete the shared memory from the master process when the shared memory is deallocated; and
    deleting the shared memory in response to the third request.

2. The method of claim 1, wherein creating and allocating the shared memory comprises:
    receiving the first request from the master process;
    creating the shared memory in response to the first request;
    sending a shared memory creation key and access information corresponding to the created shared memory to the master process;
    receiving a fourth request to set an event from the master process and setting an event of the shared memory in response to the fourth request;
    receiving a fifth request to allocate the shared memory from the one or more worker processes, which have received the shared memory creation key from the master process; and
    allocating the shared memory in response to the fifth request and sending information that is necessary in order to access the allocated shared memory to the one or more worker processes.

3. The method of claim 1, wherein the plurality of distributed deep-learning processes share, using the shared memory, the deep-learning parameters in a synchronous manner or in an asynchronous manner.

4. The method of claim 3, wherein deep-learning parameters in a synchronous manner comprises:
    updating, by the one or more worker processes, worker local weight parameter areas of the one or more worker processes using a value of a master weight parameter in the shared memory;
    accumulating, by the parameter server, gradient parameters by receiving learned worker local gradient parameters from the one or more worker processes that perform the distributed deep-learning training in the synchronous manner;
    receiving, by the parameter server, an updated master weight parameter, calculated using the accumulated gradient parameters of the one or more worker processes, from the master process, and updating, by the parameter server, the master weight parameter area with the updated master weigher parameter; and
    announcing, by the parameter server, an update of the master weight parameter area to the one or more worker processes.

5. The method of claim 4, wherein accumulating the gradient parameters comprises:
    storing the worker local gradient parameters, learned by the one or more worker processes that perform the distributed deep-learning training, in worker gradient parameter areas in the shared memory;
    receiving a request to accumulate the worker local gradient parameters from the one or more worker processes;
    accumulating the worker local gradient parameters stored in the shared memory, which correspond to the request to accumulate the worker local gradient parameters, into the updated master gradient parameter; and
    announcing completion of the accumulation to the master process.

6. The method of claim 3, wherein sharing the deep-learning parameters in an asynchronous manner comprises:
    updating, by the one or more worker processes, worker local weight parameter areas of the one or more worker processes using a value of a master weight parameter in the shared memory;
    updating, by the one or more worker processes, a worker gradient parameter in the shared memory;
    updating, by the parameter server, the master weight parameter area in response to a request to update the master weight parameter, which is received from the one or more worker processes; and announcing, by the parameter server, an update of the master weight parameter area to the one or more worker processes.

* * * * *